United States Patent
Esmailzadeh (12) 
(10) Patent No.: US 6,259,724 B1
(45) Date of Patent: *Jul. 10, 2001

(54) RANDOM ACCESS IN A MOBILE TELECOMMUNICATIONS SYSTEM

(75) Inventor: Riaz Esmailzadeh, Stockholm (SE)

(73) Assignee: Telefonaktiebolaget L M Ericsson (PUBL) (SE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/733,501

(22) Filed: Oct. 18, 1996

(51) Int. Cl.$^7$ ................................................. H04L 27/06
(52) U.S. Cl. ........................................... 375/143; 375/152
(58) Field of Search ................................... 375/207, 208, 375/209, 210, 267, 343, 316, 340, 347, 350, 136, 143, 145, 147, 152; 364/724.11; 370/320, 335, 342, 441, 479; 455/337, 132

(56) References Cited

U.S. PATENT DOCUMENTS

| | | | |
|---|---|---|---|
| 5,132,985 | 7/1992 | Hashimoto et al. | 375/1 |
| 5,297,171 * | 3/1994 | Koch | 375/343 |
| 5,361,276 * | 11/1994 | Subramanian | 375/1 |
| 5,377,225 * | 12/1994 | Davis | 375/1 |
| 5,506,861 | 4/1996 | Bottomley | 375/200 |
| 5,515,379 | 5/1996 | Crisler et al. | 370/95.3 |
| 5,608,722 * | 3/1997 | Miller | 370/320 |

(List continued on next page.)

FOREIGN PATENT DOCUMENTS

| | | |
|---|---|---|
| 25 37 683 | 8/1975 | (DE) . |
| 0 257 110 A1 | 8/1986 | (EP) . |
| 0 633 671 A2 | 5/1994 | (EP) . |
| WO 92/21196 | 11/1992 | (WO) . |
| WO 95/14336 | 5/1995 | (WO) . |

OTHER PUBLICATIONS

Design Study for a CDMA–Based Third–Generation Mobile Radio System by Alfred Baier, Senior Member, IEEE, Uwe–Carsten Fiebig, Member, IEEE, Wolfgang Granzow, Wolfgang Koch, Member, IEEE, Paul Teder, and Jörn Thielecke, Member, IEEE IEEE Journal on Selected Areas in Communications, vol. 12, No. 4, May 1994.

Design Study for a CDMA–Based Third–Generation Mobile Radio System IEEE JSAC Special Issue on "CDMA Networks", Dec. 16, 1993.

(List continued on next page.)

*Primary Examiner*—Chi Pham
*Assistant Examiner*—Emmanuel Bayard
(74) *Attorney, Agent, or Firm*—Jenkens & Gilchrist (57) ABSTRACT

A mobile communications system is provided for significantly reducing the time required to process a random access mobile-originated call. During call setup, a mobile station transmits a random access packet that includes a preamble and a plurality of fields. The information provided in these fields is used by the base station to facilitate a more efficient call setup and more quickly allocate channel resources. A system is also provided for detecting, identifying and receiving multiple random access requests. Each mobile station transmits one of a plurality of different preamble symbol patterns in a random access request packet. The base station receiver includes a plurality of accumulators, each of which is tuned to a different preamble symbol pattern. Consequently, the base station receiver can distinguish between simultaneous random access requests. This preamble symbol arrangement can also be used in conjunction with power-ramping processes, such as those used in IS-95 and CODIT systems, to provide individual power control for mobile stations making multiple random access attempts.

20 Claims, 3 Drawing Sheets

U.S. PATENT DOCUMENTS

| | | | | |
|---|---|---|---|---|
| 5,640,416 | * | 6/1997 | Chalmers | 375/206 |
| 5,673,286 | * | 9/1997 | Lomp | 375/207 |
| 5,680,414 | * | 10/1997 | Durrant et al. | 375/208 |
| 5,691,974 | * | 11/1997 | Zehavi et al. | 370/203 |
| 5,696,762 | * | 12/1997 | Natali et al. | 375/206 |
| 5,712,870 | * | 1/1998 | Petrick | 375/206 |
| 5,724,384 | * | 3/1998 | Kim et al. | 375/208 |
| 5,745,531 | * | 4/1998 | Sawahashi et al. | 375/345 |
| 5,764,690 | * | 6/1998 | Blanchard et al. | 375/206 |
| 5,774,494 | * | 6/1998 | Sawahashi et al. | 375/343 |
| 5,790,588 | * | 8/1998 | Fukawa et al. | 375/200 |
| 5,796,776 | * | 8/1998 | Lomp et al. | 375/222 |
| 5,818,868 | * | 10/1998 | Gaudenzi et al. | 375/206 |

OTHER PUBLICATIONS

A. Baier, Philips Kommunikations Industrie AG, D–90327 Nürnberg, Germany.

U.–C. Fiebig, German Aerospace Research Establishment, D–82234 Oberpfaffenhofen, Germany.

W. Granzow, Philips Kommunikations Industrie AG, D–90327 Nürnberg, Germany.

W. Koch, Philips Kommunikations Industrie AG, D–90327 Nürnberg, Germany.

Teder, J., Ericsson Radio Systems, S–16480 Stockholm Sweden.

J. Thielecke, Philips Kommunikations Industrie AG, D–90327 Nürnberg, Germany.

* cited by examiner

RANDOM ACCESS IN A MOBILE TELECOMMUNICATIONS SYSTEM

BACKGROUND OF THE INVENTION

1. Technical Field of the Invention

The present invention relates generally to the field of mobile telecommunications and, in particular, to a system for processing multiple random access mobile-originated calls.

2. Description of Related Art

The next generation of mobile communications systems will be required to provide a broad selection of telecommunications services including digital voice, video and data in packet and channel-switched modes. As a result, the number of calls being made is expected to increase significantly, which will result in much higher traffic density on random access channels (RACHs). Unfortunately, this higher traffic density will also result in increased collisions and access failures. Consequently, the new generation of mobile communications systems will have to use much faster random access procedures, in order to increase their access success rates and reduce their access request processing times.

In most mobile communications systems, such as, for example, the European joint development referred to as the "Code Division Testbed" (CODIT), and systems operating in accordance with the IS-95 Standard (ANSI J-STD-008), a mobile station can gain access to a base station by first determining that the RACH is available for use. Then, the mobile station transmits a series of access request preambles (e.g., single 127 chip symbols) with increasing power levels, until the base station detects the access request. In response, the base station starts the process of controlling the mobile station's transmitted power via a downlink channel. Once the initial "handshaking" between the mobile station and base station has been completed, the mobile user transmits a random access message.

More specifically, in a CODIT-based Code Division Multiple Access (CDMA) system, a mobile station will attempt to access the base station receiver by using a "power ramping" process that increases the power level of each successive transmitted preamble symbol. As soon as an access request preamble is detected, the base station activates a closed loop power control circuit, which functions to control the mobile station's transmitted power level in order to keep the received signal power from the mobile station at a desired level. The mobile station then transmits its specific access request data. The base station's receiver "despreads" the received (spread spectrum) signals using a matched filter, and diversity-combines the despread signals to take advantage of channel multipath diversity.

In an IS-95 CDMA system, a similar random access technique is used. However, the primary difference between the CODIT and IS-95 process is that the IS-95 mobile station transmits a complete random access packet. If the base station does not acknowledge the access request, the IS-95 mobile station re-transmits the access request packet at a higher power level. This process continues until the base station acknowledges the access request.

In the Spread Spectrum Slot Reservation Multiple Access (SS-SRMA) System, a slotted ALOHA random access scheme is used. Generally, a mobile station transmits and re-transmits the random access packet until the correct reception of the random access packet is acknowledged by the base station. The transmissions are spaced apart by random time intervals. However, the slotted ALOHA random access process is inherently unstable. Consequently, some form of feedback loop must be implemented to stabilize such a system. Furthermore, no provision is made to distinguish between multiple signal arrivals, which results in an increasing number of collisions and, necessarily, re-transmissions, and thus worsens the instability problem.

A number of significant problems exist with the above-described random access techniques. For example, in a CODIT system, a base station receiver can detect only one random access at a time. If two mobile stations transmit their access requests at the same time, either the two messages will collide and be destroyed, or one message will be recognized and the other ignored. Consequently, the throughput efficiency of such a system is relatively low, its collision ratio is high, and the mean time that it takes to achieve a successful access is excessively long. A system that would resolve collisions problems and effectively process multiple random requests is desirable, but to increase the throughput of the existing systems would require an increase in the number of access codes used (which are typically limited in number), and a corresponding number of additional matched filters would be required at the base station receiver.

Although existing IS-95 and SS-SRMA documents indicate that their base station CDMA receivers can demodulate multiple random access messages arriving in the same slot, these documents do not specify how this process can be implemented. Furthermore, the IS-95 documents do not indicate how to control the transmission power of the individual multiple access signals.

Additionally, the above-described IS-95 and CODIT random access processes are relatively slow, because numerous power ramping increments have to occur until an access request can be detected and acknowledged, and re-transmissions in the SS-SRMA system cause intolerable delays. Also, it is a relatively difficult process to implement a system that can receive multiple random access requests and control the power level of each individual request message. Consequently, for all of the above-described reasons, the usage efficiencies of the CODIT, IS-95 and SS-SRMA RACHs are very low, and traffic interference experienced by users of these systems is excessive due to this inefficient use of the RACH and the numerous re-transmissions required.

Yet another problem with these CDMA systems is that they are basically not designed to resolve packet collision problems. Consequently, the throughput of these systems is further reduced because of numerous failed random access attempts and further related inefficiencies.

SUMMARY OF THE INVENTION

A mobile communications system is provided for significantly reducing the time required to process a random access mobile-originated call. During call setup, a mobile station transmits a random access packet that includes a preamble and a plurality of fields. The information provided in these fields is used by the base station to facilitate a more efficient call setup and more quickly allocate channel resources.

A mobile communications system is also provided for detecting, identifying and receiving multiple random access requests. Each mobile station transmits one of a plurality of different preamble symbol patterns in a random access request packet. The base station receiver includes a plurality of accumulators, each of which is tuned to a different preamble symbol pattern. Consequently, the base station receiver can distinguish between and process simultaneous random access requests. This preamble symbol arrangement can also be used in conjunction with power-ramping processes, such as those used in IS-95 and CODIT systems, to provide individual power control for mobile stations making multiple random access attempts.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiment of the present invention and its advantages are best understood by referring to FIGS. 1–7 of the drawings, like numerals being used for like and corresponding parts of the various drawings.

Figure 1:
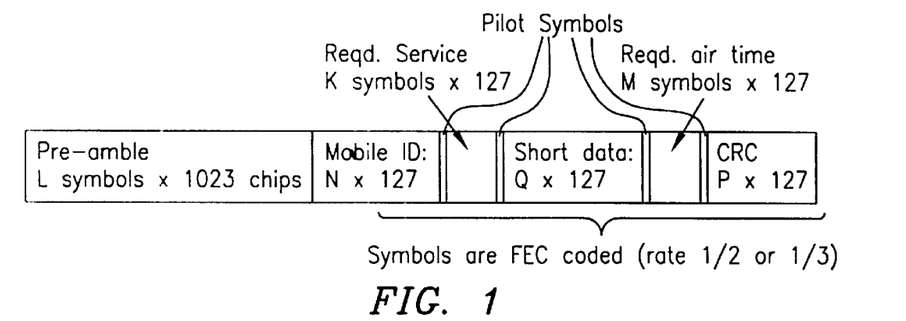
FIG. 1 is a diagram that illustrates an access request data frame, in accordance with a preferred embodiment of the present invention.

Essentially, during the access request phase of a mobile-originated call, the mobile station that is preparing to request access to the base station receiver generates an access request data frame to be transmitted. A diagram that illustrates such an access request data frame is shown in FIG. 1. For the preferred embodiment of the present invention, the access request data frame is composed of a preamble, and forward-error-correction (FEC) coded information about the mobile station's identity, the type of service required, the air-time required, "short" data, and error detection symbols. Each access request frame is typically 10 msec long. Alternatively, a shorter frame length may be used (e.g., 5 msec long). The access request frame described herein can be referred to broadly as a "facilitating" random access request frame.

Prior to generating the access request data frame, it is assumed that the mobile station has already obtained frame synchronization information from the base station's broadcast channel (BCH), as well as estimating shadowing and distance attenuation with respect to the transmission channel (the transmission path between the mobile and base stations). Taking into account this information, the mobile station transmits the access request data packet at the beginning of the next random access frame, and with an adequate power level to compensate for shadowing and distance attenuation. At the intended base station, the access request frame is demodulated utilizing a matched filter-based receiver. If the access request frame is properly received and demodulated, the base station acknowledges the request and schedules accordingly to process the mobile station's subsequent information transmissions.

Figure 2:
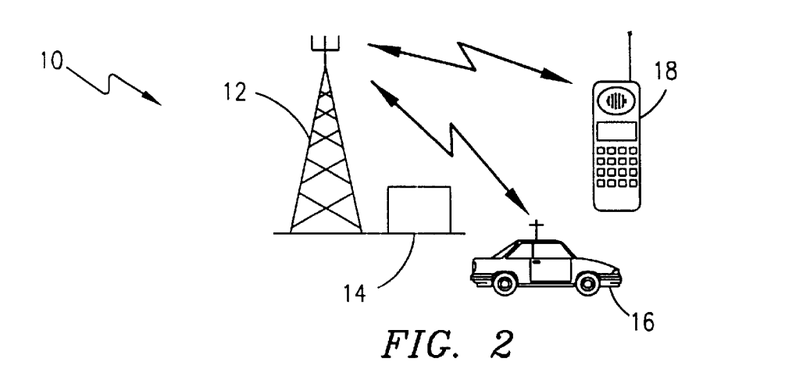
FIG. 2 is a schematic block diagram of a cellular communications system.

Specifically, referring to FIG. 2, a pertinent section of a cellular communications system 10 is shown, which includes a base station transmit/receive antenna 12 and transmitter/receiver section 14, and a plurality of mobile stations 16 and 18. Although only two mobile stations are shown, FIG. 2 is for illustrative purposes and the present invention can be assumed to include more than two mobile stations. Prior to generating and transmitting an access request frame, a mobile station (e.g., 16) acquires synchronization, or synchronizes, with an intended base station receiver (14). The mobile station then determines the starting time for each random access frame, from the base station's broadcast/pilot channel information. If the base station is configured to measure and broadcast the total amount of traffic present at its receiver (e.g., representing multi-user interference), the mobile station receives and detects this information and uses it to calculate a signal transmission level that is needed to overcome the interference. By measuring the level and rate of change of the received broadcast/pilot signals, the mobile station estimates the Doppler fading rate and number of significant "rays" existing in the transmission channel. The mobile station then estimates the shadowing and distance attenuation of the transmission channel, by measuring the path loss over a sufficient number of fading periods. Taking into account the degree of transmission diversity required by the system, the mobile station then calculates the transmission power level required for the access request frame to be received at the base station, with a predetermined signal-to-interference ratio.

Referring again to FIG. 1, the access request frame shown includes a preamble of L unmodulated symbols. Preferably, for this embodiment, each symbol is 1023 chips long. The spreading ratio of the preamble is selected to be longer than the spreading ratio of the rest of the frame, in order to have a better spreading gain and also to reduce uncertainty at the base station. Due to different users' propagation delays, and because the base station has to receive the first symbol within a pre-defined window, the preamble symbols are chosen to be longer than the system's maximum propagation delay. The preamble can contain a unique signature pattern, which will be described in detail below.

The access request frame also includes a user identity (ID) field of length N symbols. The mobile station randomly selects the symbols that make up the ID field. The use of a longer user ID will decrease the probability that simultaneous random access requests from two mobile stations (e.g., 16 and 18) will include the same random ID. However, using a longer identity field will also increase the overall frame length, which in turn, can increase the frame error rate (FER) probability. So, the length of the ID field should be selected with this characteristic in mind.

Another field in the access request frame is the required service number (K). The length of the required service number is determined by the number of possible services that are to be provided by the system. A short data message Q symbols long may also be transmitted in the random access request packet to increase the transmission efficiency. For example, a short data message transmission can obviate the need to complete the normal call setup process and reduce the other overhead messages required, since there is a very limited amount of data to be transmitted.

A required air time field of M symbols is also included in the random access request frame. For this embodiment, "required air time" is defined as the total time the mobile station will need in order to transmit a complete message. The level of detail to be included in this field is a design preference, which depends primarily on the extent that the FER will be affected. An error detection redundancy field (cyclic redundancy code of P symbols long) is also included as a design preference, which depends on the overall frame length desired. Except for the preamble, the information included in the random access request frame is forward error correction (FEC) coded using a known coding technique. Although the embodiment shown in FIG. 1 includes specific information in each FEC coded field, the invention is not intended to be so limited in scope. For example, any information that can be used by a base station receiver to more quickly and efficiently set up a random access call can be included as a field in the frame structure shown. Also, the information included in these fields does not have to be FEC coded in order to be covered by the present inventive concept.

The random access request frame shown in FIG. 1 is preferably transmitted at the beginning of the next slot. The mobile station (16) sets the transmission power level for this packet at a level appropriate to compensate for shadowing and distance transmission channel attenuation. For this embodiment, the Rayleigh fading factor can be assumed to be largely compensated for by employing diversity reception and combining techniques at the base station receiver 14.

Figure 3:
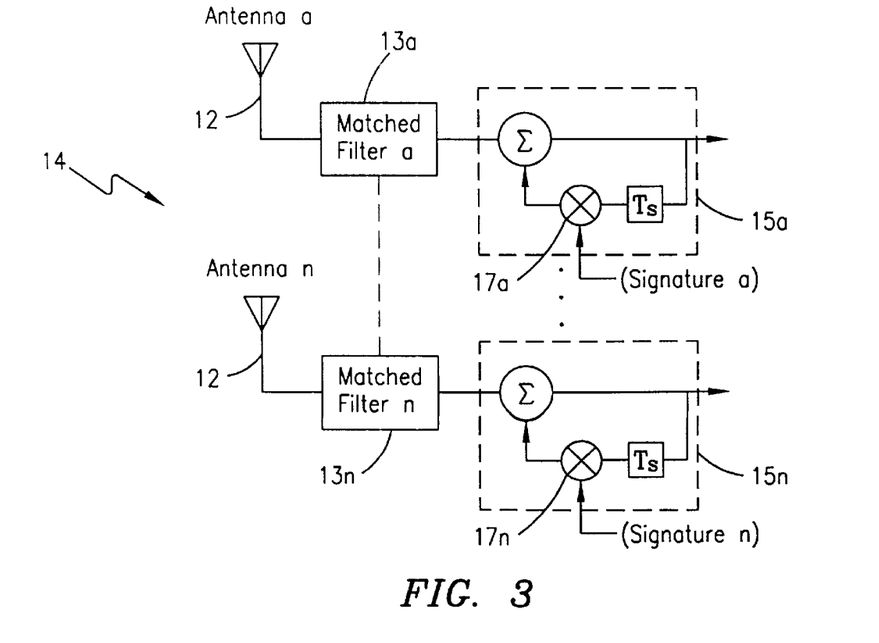
FIG. 3 is a schematic block diagram that illustrates a pertinent section of a base station random access receiver, in accordance with the preferred embodiment of the present invention.

FIG. 3 is a schematic block diagram that illustrates a pertinent section of a base station random access receiver 14, in accordance with the preferred embodiment of the present invention. As shown in FIG. 3, the front end of the base station receiver 10 includes a plurality of antennas 12a–n. The output of each antenna is coupled to a respective matched filter 13a–n. The output of each matched filter is coupled to a respective accumulator 15a–n. The output of each accumulator 15a–n is coupled to a respective peak signal detector (not explicitly shown). A more complete receiver section will be described in detail below.

In operation, each matched filter 13a–n is tuned initially to the base station's specific preamble spreading code. The output of each matched filter is recursively accumulated over the symbol period, $T_s$, for the duration of L preamble symbols. If the preamble includes a signature pattern (described below), the accumulation is accomplished by using a bank of accumulators, with each accumulator tuned to one of the signature patterns. The type of recursive accumulation technique used may be either coherent or incoherent accumulation, depending on the transmission channel's fading rate. Preferably, coherent accumulation is used because it is more beneficial for CDMA demodulation and can be used even at moderately high fading rates.

At the end of the preamble period, each accumulator 15a–n in the base station receiver section 14 searches the output of the respective matched filter 13a–n for each signal peak that exceeds a predetermined detection threshold. Each accumulator then registers (detects and stores) the magnitude and relative phase of each of those peak signals, and thereby determines the number of significant signal rays available for demodulation in the receiver. A rake receiver section (not explicitly shown) demodulates the data portion of the random access request frame, by using one of a selection, equal gain, or maximal ratio combining demodulation schemes. For one embodiment, a selection combining demodulation scheme is preferred, because it facilitates multiple random access reception (discussed below). For another embodiment, an equal gain or maximal ratio combining demodulation scheme may be used when an identification of each individual access attempt is possible. The demodulation schemes in this embodiment will facilitate the operation of mobile stations at lower transmission signal power levels. Receiver section 14 coherently demodulates the data received. As shown in FIG. 1, pilot tones are inserted in the random access request packet at the mobile station, to facilitate the coherent demodulation process at the other end. The demodulated data is then decoded and checked for errors.

If a random access request packet is correctly received and demodulated, the base station 14 transmits an acknowledgment message to the mobile station 16, and schedules the user's call to proceed if appropriate channel resources are available. For short packet data (Q), the base station needs only transmit an acknowledgment message.

If no channel resources are available within the scheduling timeframe, the base station transmits a "busy" message that may instruct the mobile station when to transmit a new request. If the base station does not transmit an acknowledgment message, the mobile station can assume that the request attempt was unsuccessful.

By having a mobile station (e.g., 16, 18) transmit a random access request frame such as the frame illustrated in FIG. 1, the required service time (K), required air time (M), and short data (Q) fields can be used advantageously to facilitate the transmission of the packet data that follows the access request. Since these fields can be predetermined and that information can be provided, a priori, to the base station's receiver, the receiver can be configured more quickly and efficiently than prior systems.

A method is also provided for regulating access request arrivals at the receiver 14 if collisions begin to occur, by having the base station broadcast an m-bit busy flag for use by the mobile stations. For example, the value of m can be determined by the number of collisions the base station has detected. The base station can thus regulate the rate of the access request transmissions (and arrivals) by choosing one of $2^m$ levels and transmitting that information for allocation purposes to the mobile stations in the network.

Figure 4:
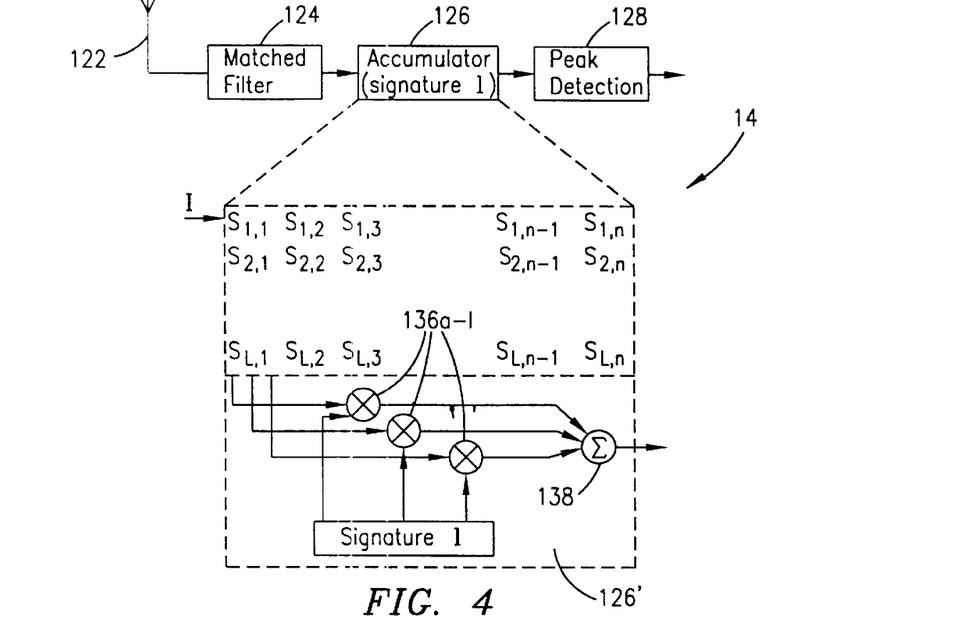
FIG. 4 is a schematic block diagram that illustrates a receiver that can be used to implement a method of demodulating multiple random access requests and also providing power control processing for each request, in accordance with a second embodiment of the present invention.

FIG. 4 is a schematic block diagram that illustrates a receiver 14 that can be used to implement a method of identifying and demodulating multiple random access requests. In order to enable a base station receiver to distinguish between multiple random access requests, a novel preamble bit or symbol pattern can be used. Each requesting mobile station can transmit one of L different preamble bit or symbol patterns (hereinafter referred to as "signatures"). As shown in FIG. 4, each of L accumulators is tuned to detect a specific signature (l) coupled from the output of the matched filter. This signature preamble arrangement (described below) may also be used for power-ramping, such as used in IS-95 and CODIT systems, to distinguish between multiple access attempts and provide separate power control processing for individual mobile stations making random access attempts.

Figure 5:
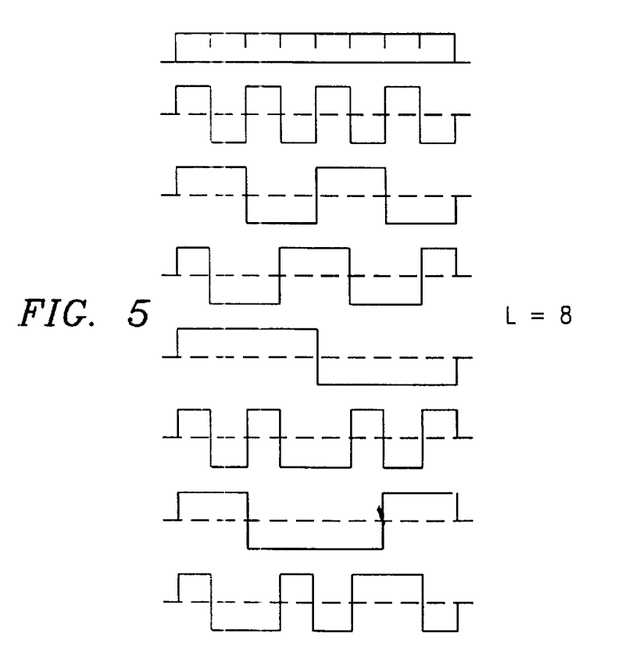
FIG. 5 is a diagram that shows eight exemplary signature patterns that can be used as random access request preambles by a plurality of mobile stations.

FIG. 5 is a diagram that shows eight exemplary signature patterns that can be used as preambles by a plurality of mobile stations. Preferably, as shown in FIG. 5, the signature patterns used are orthogonal to each other. At the base station receiver, one accumulator is provided for each signature pattern. Each accumulator sums the signals output from the matched filter.

In operation, a mobile station (16, 18, etc.) that is preparing to transmit a random access request message, randomly selects one of the L signatures from an internal memory location. The mobile station then transmits a preamble in accordance with the selected signature's pattern. When the output of the accumulator 126 (1–1) associated with the selected signature indicates the presence of a random access signal at peak detector 128, a corresponding demodulator (not explicitly shown) is activated. A maximal ratio combining method can be used to combine all of the rays detected from that mobile station. For this embodiment, accumulator 126 is preferably a buffer memory device, wherein the matched filter output samples ($S_{ij}$) are written into the rows of an array 126'. The width of the array is one symbol long (N), and the height of the array is equal to L. The array elements are added over the "accumulator window length" L. Although not explicitly shown, a separate accumulator is used in each of the I and Q branches in receiver 14, so that the received signals can be coherently accumulated by a known technique. As shown by this exemplary illustration, accumulator 126 is used in the receiver's I branch. Using the structure and method illustrated by FIG. 4, the receiver's signal-to-interference power ratio can be increased by L times over prior systems.

Specifically, the signals, $S_{ij}$, are multiplied by mixers 136(a–l) and summed at summer 138. The number of signatures used (l) is preferably based on the amount of traffic on the RACH, the probability that two mobile stations will not select the same signature during the same preamble period, and the packet size constraints imposed on the RACH. In this embodiment, 8 signatures and corresponding accumulators are used, which provides a 9 dB signal gain for each mobile station's transmission. In the embodiment illustrated by FIG. 3 above, a signature pattern (a–n) is input to a respective mixer 17a–n to facilitate the demodulation of the plurality of random access requests.

If an error occurs in demodulating the received data, a busy/flag procedure can be used. For example, the base station can acknowledge the receipt of a random access packet from a specific mobile station (that transmitted a specific signature preamble). The base station can instruct that mobile station to utilize a particular code for subsequent transmissions, and bar other mobile stations from using that allocated code. Consequently, erroneous data or unsuccessful access attempts can be detected and re-transmitted more quickly, and the probability of additional errors or collisions will be significantly reduced.

Figure 6:
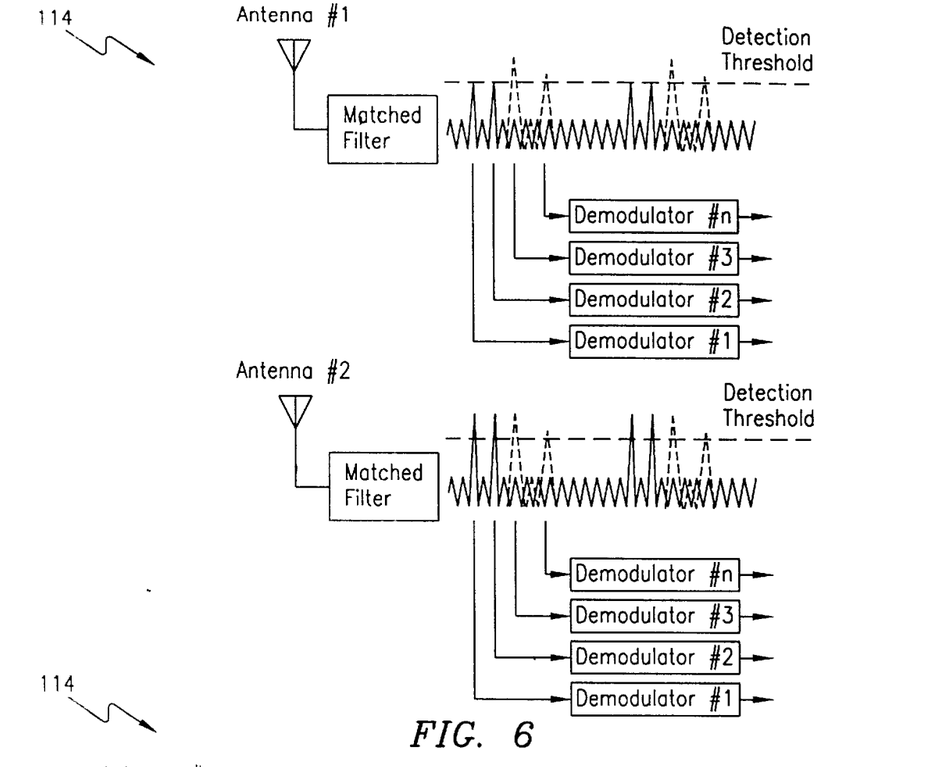
FIG. 6 is a schematic block diagram that illustrates how multiple random access requests can be correctly received and demodulated, in accordance with another embodiment of the present invention.

FIG. 6 is a schematic block diagram that illustrates how multiple random access requests can be correctly received and demodulated, in accordance with a second embodiment of the present invention. The preferred method utilizes a form of multipath and space diversity reception along with selection combining techniques. Generally, diversity selection combining methods are used to individually analyze and demodulate all received rays which are above a predetermined threshold. Consequently, if a plurality of access requests arrive at receiver 114 at the same time, all of the requests will be processed equally, and the probability will thereby be increased that all of the mobile station's requests will be correctly received and demodulated.

The selection combining method utilizes both multipath diversity (e.g., demodulating multiple numbers of rays) and space diversity (e.g., multiple antennas). In this way, as shown in FIG. 6, a plurality of access requests can be correctly received and demodulated, because the Rayleigh fading process in the transmission channel combined with the effects of these diversity reception methods can capitalize on the fact that certain access requests may be weaker than others in one diversity path, but stronger in another path.

Figure 7:
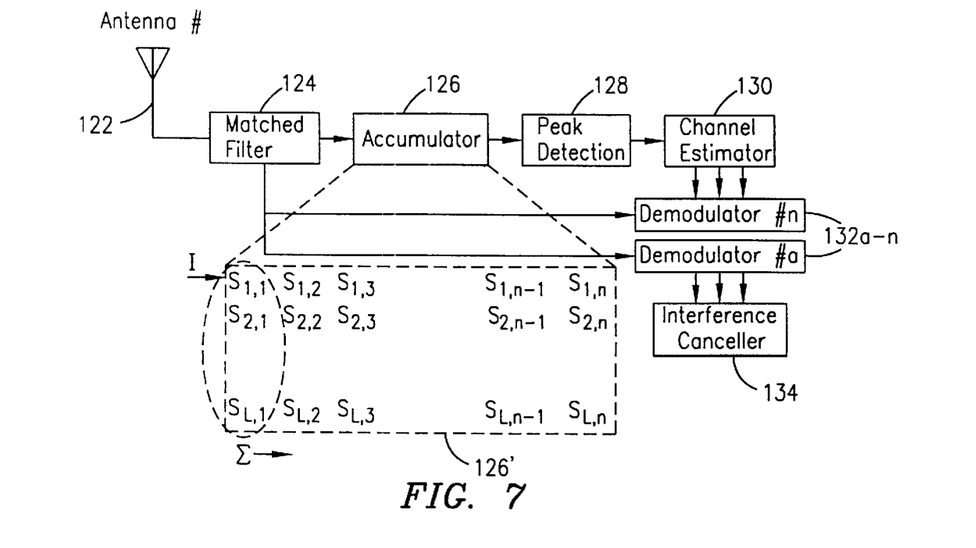
FIG. 7 is a schematic block diagram of the details of the base station receiver shown in FIG. 6.

FIG. 7 is a schematic block diagram of the details of the base station receiver 114 shown partly in FIG. 6, which can be used to receive and demodulate random access requests made by a plurality of mobile stations, in accordance with the second embodiment of the present invention. Receiver 114 includes a receiving antenna 122 connected to an input of a matched filter 124. During a preamble period (L symbols long), the output of matched filter 124 is accumulated in accumulator 126 over the L symbol periods to increase the received signal-to-interference power ratio. For this embodiment, accumulator 126 is preferably a buffer memory device, wherein the matched filter output samples ($S_{ij}$) are written into the rows of an array 126'. The width of the array is one symbol long (N), and the height of the array is equal to L. The array elements are added over the "accumulator window length" L. Although not explicitly shown, a separate accumulator is used in each of the I and Q branches in receiver 114, so that the received signals can be coherently accumulated by a known technique. As shown by this exemplary illustration, accumulator 126 is used in the receiver's I branch. Using the structure and method illustrated by FIG. 7, the receiver's signal-to-interference power ratio can be increased by L times over prior systems.

The output of accumulator 126 is connected to an input of peak detection circuit 128. When a signal is detected from accumulator 126, the output of peak detection circuit 128 is coupled to a channel estimator unit 130. Channel estimator unit 130 estimates the phase and amplitude of the detected peak signal. As a plurality of signal peaks is detected from accumulator 126, the receiver assigns each such signal to a separate demodulator 132a–n. Subsequently, each separate signal from demodulators 132a–n is treated as if it is incoming from a different mobile station.

The duration of a random access request transmission is relatively small. Consequently, no significant additional interference is deemed to be exerted on traffic user signals by these requests. However, the base station's receiver can use an interference cancellation unit 134 to remove any existing high interference already exerted on traffic users of the system. Interference cancellation can be readily implemented during the preamble period, because both the phase and polarity of the incoming signals are known. As the random access message data is received, the base station receiver can continue the interference cancellation process.

Although a preferred embodiment of the method and apparatus of the present invention has been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A system for use in demodulating a plurality of random access request messages, comprising:
    at least one matched filter, said at least one matched filter adapted to despread an input thereto;
    a first accumulator, a despread output of said at least one matched filter connected to an input of said first accumulator, said first accumulator associated with a first signature pattern;
    a second accumulator, said despread output of said at least one matched filter connected to an input of said second accumulator, said second accumulator associated with a second signature pattern;
    wherein said first signature pattern differs from said second signature pattern, and wherein substantially simultaneously received random request messages are distinguished between and processed simultaneously.

2. The system according to claim 1, wherein an output of said first accumulator is coupled to a peak detector.

3. The system according to claim 1, wherein an output of at least one receiving antenna is coupled to said input of said at least one matched filter.

4. A receiver for use in demodulating a plurality of random access request messages, comprising:

a matched filter means for despreading at least one of said plurality of random access request messages;

an accumulator means having a plurality of accumulators for summing a despread said at least one of said plurality of random access request messages, each accumulator of said accumulator means coupled to an output of said matched filter means, said accumulator means including a plurality of signature patterns, at least one signature pattern of said plurality of signature patterns associated with a corresponding accumulator of said accumulator means;

a peak signal detector means, each peak signal detector of said peak signal detector means for detecting a predetermined signal at a respective output of a respective accumulator of said accumulator means;

a channel estimation means for estimating a traffic channel in response to an output signal from said peak signal detector means; and a demodulation means for demodulating said despread said at least one of said plurality of random access request messages.

5. The receiver according to claim 4, wherein said accumulator means comprises an L by n array.

6. The receiver according to claim 4, further comprising an I portion of an IQ demodulator.

7. The receiver according to claim 4, further comprising a Q portion of an IQ demodulator.

8. The receiver according to claim 4, further comprising an interference canceller.

9. A method in a mobile station for implementing a random access procedure in a mobile telecommunications system, comprising the steps of:

acquiring synchronization with an intended base station;

selecting a signature pattern from a plurality of signature patterns;

forming an access request frame using said signature pattern;

spreading said access request frame with a spreading code; and transmitting said access request frame that was spread in said step of spreading to said intended base station.

10. The method according to claim 9, wherein said step of selecting a signature pattern further comprises the step of randomly selecting said signature pattern from an internal memory location of the mobile station.

11. The method according to claim 9, wherein said step of forming an access request frame using said signature pattern further comprises the step of inserting said signature pattern into a preamble of said access request frame.

12. A method in a base station for demodulating a plurality of random access requests, comprising the steps of:

receiving a first random access request, said first random access request including a first signature pattern;

applying said first random access request to at least one matched filter to produce a despread result;

accumulating said despread result using a plurality of different signature patterns to produce a plurality of accumulation results; and detecting at least a first peak signal from said plurality of accumulation results, wherein said random access requests are received substantially simultaneously.

13. The method according to claim 12, wherein said first random access request comprises a first random access request frame, said first random access request frame having a preamble that includes said first signature pattern.

14. The method according to claim 12, wherein said step of applying said first random access request to at least one matched filter to produce a despread result further comprises the step of applying said first random access request to said at least one matched filter using a specific preamble spreading code.

15. The method according to claim 12, wherein said step of accumulating said despread result using a plurality of different signature patterns to produce a plurality of accumulation results further comprises the step of accumulating said despread result recursively.

16. The method according to claim 12, further comprising the step of:

receiving a second random access request, said second random access request including a second signature pattern, said first signature pattern being different from said second signature pattern; and wherein said step of applying said first random access request to at least one matched filter to produce a dea pud result further comprises the step of applying said gcgond random access request to said at least one matched filter to produce said despread result; and said step of detecting at least a first first peak signal from said plurality of accumulation results further comprises the step of detecting a second peak signal from said plurality of accumulation results.

17. The method according to claim 16, wherein said steps of receiving a first random access request and receiving a second random access request occur substantially simultaneously.

18. The method according to claim 16, wherein said at least a first peak signal and said second peak signal are detected from said plurality of accumulation results substantially simultaneously.

19. The method according to claim 16, further comprising the step of differentiating said first random access request from said second random access request based, at least in part, on said at least a first peak signal and said second peak signal.

20. The system according to claim 1, wherein said first accumulator and said second accumulator comprise an accumulator bank.

* * * * *

UNITED STATES PATENT AND TRADEMARK OFFICE
CERTIFICATE OF CORRECTION

PATENT NO. : 6,259,724 B1  
DATED : July 10, 2001  
INVENTOR(S) : Riaz Esmailzadeh Page 1 of 1

It is certified that error appears in the above-identified patent and that said Letters Patent is hereby corrected as shown below:

Column 5,  
Line 55, replace "section' 14" with -- section 14 --

Column 8,  
Line 67, replace "," with -- ; --

Column 10,  
Line 37, replace "gcgond" with -- second --  
Line 36, replace "dea pud" with -- despread --  
Line 40, delete repetitive "first"

Signed and Sealed this

Thirtieth Day of April, 2002

Attest:

Attesting Officer

JAMES E. ROGAN  
Director of the United States Patent and Trademark Office